US012156307B2

(12) United States Patent
Wouters et al.

(10) Patent No.: US 12,156,307 B2
(45) Date of Patent: Nov. 26, 2024

(54) METHOD OF CONTROLLING A LIGHTING EMITTING DIODE LIGHTING DEVICE AND A LIGHT EMITTING DIODE, LED, BASED LIGHTING DEVICE

(71) Applicant: SIGNIFY HOLDING B.V., Eindhoven (NL)

(72) Inventors: Vincent Arnoud Wouters, Eindhoven (NL); Berend Jan Willem Ter Weeme, Eindhoven (NL); Aldegonda Lucia Weijers, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 41 days.

(21) Appl. No.: 17/927,045

(22) PCT Filed: Jun. 8, 2021

(86) PCT No.: PCT/EP2021/065226
§ 371 (c)(1),
(2) Date: Nov. 22, 2022

(87) PCT Pub. No.: WO2021/249975
PCT Pub. Date: Dec. 16, 2021

(65) Prior Publication Data

US 2023/0209671 A1 Jun. 29, 2023

(30) Foreign Application Priority Data

Jun. 9, 2020 (EP) .................................... 20178967
Jun. 16, 2020 (EP) .................................... 20180174

(51) Int. Cl.
*H05B 45/20* (2020.01)
*F21S 4/10* (2016.01)
(Continued)

(52) U.S. Cl.
CPC ................ *H05B 45/20* (2020.01); *F21S 4/10* (2016.01); *H05B 45/305* (2020.01); *H05B 45/48* (2020.01); *F21Y 2115/10* (2016.08)

(58) Field of Classification Search
None
See application file for complete search history.

(56) References Cited

U.S. PATENT DOCUMENTS

2012/0187845 A1* 7/2012 Saes ....................... H05B 45/28 315/297
2013/0069561 A1 3/2013 Melanson et al.
(Continued)

*Primary Examiner* — Anh Q Tran

(57) ABSTRACT

A method of controlling a multicolor LED lighting device is discloses. The LED lighting device comprises at least two series-connected LED light sources with different color metric values and supplied with a current, each LED light source is controlled by a respective switch operating according to a duty cycle. The method adapts an operating current amplitude supplied to the multicolor LED lighting device based on a color point that is required by a user. The method comprises the steps of receiving a designated color metric value for the LED lighting device; determining an operating current amplitude for the LED lighting device based on a current profile over a range of color metric values and the designated color metric value, and setting the current supplied to the LED light sources to the determined operating current amplitude.

10 Claims, 5 Drawing Sheets

(51) Int. Cl.

| | |
|---|---|
| ***H05B 45/305*** | (2020.01) |
| ***H05B 45/48*** | (2020.01) |
| *F21Y 115/10* | (2016.01) |

(56) References Cited

U.S. PATENT DOCUMENTS

| | | | | |
|---|---|---|---|---|
| 2013/0162151 | A1* | 6/2013 | van de Ven ............ | H05B 45/48 315/193 |
| 2013/0278153 | A1 | 10/2013 | Pi | |
| 2014/0232297 | A1* | 8/2014 | Chobot ................ | H05B 47/105 315/299 |
| 2017/0202071 | A1 | 7/2017 | Chen et al. | |
| 2019/0110343 | A1 | 4/2019 | Van Kaathoven et al. | |

* cited by examiner

METHOD OF CONTROLLING A LIGHTING EMITTING DIODE LIGHTING DEVICE AND A LIGHT EMITTING DIODE, LED, BASED LIGHTING DEVICE

CROSS-REFERENCE TO PRIOR APPLICATIONS

This application is the U.S. National Phase application under 35 U.S.C. § 371 of International Application No. PCT/EP2021/065226, filed on Jun. 8, 2021, which claims the benefits of European Patent application Ser. No. 20/180,174.3, filed on Jun. 16, 2020 and European Patent Application No. 20178967.4, filed on Jun. 9, 2020. These applications are hereby incorporated by reference herein.

TECHNICAL FIELD

The present disclosure generally relates to the field of lighting device control, and, more specifically, to a method of controlling a multicolor Light Emitting Diode, LED, based lighting device and an LED lighting device.

BACKGROUND

A multicolor LED lamp generally comprises a number of LED light sources of different colors. Each of the LED light sources may be controlled individually by a separate switch, thereby the LED light sources may operate independent of each other to produce different output lighting colors. On the other hand, light from two or more LED light sources may be mixed to give a desired output lighting color.

In many multicolor LED lamps, pulse width modulation, PWM, is used to control the color and the intensity of the LED light sources. PWM allows maximum control of the color of an LED lamp. Alternative control methods, such as current control, may suffer from color inconsistency. Therefore, PWM in which the current is fixed is the dominant architecture for color control of LED lamps.

A problem with a PWM-controlled LED lamp is related to contradicting requirements of the current supplied to the LED light sources posed by an efficacy of the LED lamp and by a flux output of the lamp.

With a PWM-controlled LED lamp, the current is fixed for all color points, which may be represented in correlated color temperatures, CCTs, for example. It is as such a compromise as a result of different requirements at different color points. At a certain white point, e.g. 4000 K, the efficacy needs to be optimal, which requires a current as low as possible. On the other hand, at other color points, for cost reasons and sometimes also for size reasons, the flux output may need to be as high as possible with the minimum number of LEDs. Contrary to the low current required by the high efficacy, a high flux output may require a relatively high current.

Due to the above facts, a trade-off normally has to be selected, which may reduce not only the flux output capability but also the efficacy of the corresponding LED lamp.

Therefore, there is a genuine need of a method of controlling the LED lamp that helps to ensure and achieve improved performance with higher flux and higher efficacy of the multicolor LED lamps.

SUMMARY

In a first aspect of the present disclosure, there is presented a method of controlling a light emitting diode, LED, lighting device, the LED lighting device comprising at least two series-connected LED light sources with different color metric values and supplied with a current, each LED light source being controlled by a respective switch coupled in parallel to the respective LED light source and operating according to a duty cycle, the method performed by a controller and comprising the steps of:

- receiving a designated color metric value for the LED lighting device;
- determining an operating current amplitude for the LED lighting device based on a current profile over a range of color metric values and the designated color metric value, and
- setting the current supplied to the LED light sources to the determined operating current amplitude.

The present disclosure is based on the insight that adapting an operating current amplitude of a LED lighting device, comprising LED light sources of different color metric values, based on a color metric value, such as a color temperature representing a color point, allows the LED lighting device to be optimized in terms of its efficacy and flux output, without making a trade-off between the efficacy and flux output of the LED lighting device.

The optimization is realized by the method according to the first aspect of the present disclosure. According to the method, it first receives a designated color metric value, which determines a color appearance of the LED lighting device. The method then determines an operating current amplitude for the LED lighting device, with reference to a current profile designed for a range of color metric values and based on the designated color metric value. A current supplied to the LED light sources is then set to the determined operating current amplitude.

The current profile is designed such that a flux output of the LED lighting device can be increased for color points other than e.g. 4000 K which normally requires a lowest current, without compromising the efficacy of the LED lighting device as a whole. As a result, determining the operating current amplitude for the LED lighting device based on the designed current profile for a range of color metric values and the designated or required color metric allows the LED lighting device to have maximum flux output for other color points other than e.g. 4000 K.

In particular, at the color temperature 4000 K, the operating current amplitude may stay low to achieve optimal flux output. On the other hand, the operating current amplitude may be increased for other color temperatures, thereby achieving higher flux at other color temperatures. The increase of the operating current amplitude needs to stay within a specified power level of the LED lighting device.

The LED lighting device thereby achieves a higher or optimal flux output at a first color temperature and a higher or optimal power efficacy at a second color temperature at the same time. Preferably at a color metric value having a high flux, the current amplitude is lower than at a color metric value having a low flux. The color metric value may be the color temperature where the optimal power efficacy is achieved, e.g. at 4000 K.

It is an insight of the investors that at a specific color metric value, a user perceives a higher light output, i.e. flux, at a given power than at a different color metric value at the same power. This means that the efficacy of the LED lighting device is different at different color metric values. For example, a user perceives at 4000 K a highest flux per power. The inventors have acknowledged that at this color metric value, the power can be lowest, allowing the user to still perceive enough light output. At this lower power, the current is lower, resulting in a higher efficacy.

In an embodiment of the present disclosure, the designated color metric value comprises a color temperature value or a set of color coordinates.

The color temperature value may be for example a CCT value. On the other hand, the color metric value may also be a set of CIE xy coordinates. This value may be generated based on for example a color selected by a user via a remote controller for the LED lighting device.

In an embodiment of the present disclosure, the designated color metric value is received from a user.

This allows the user to control a color appearance of the LED lighting device as needed and according to his or her preference, which helps to render better user experience.

The designated color metric value may be for example represented by a color available to be selected by the user via a control panel or a remote controller. There may be different color options on the control panel, such that the user may select and set different colors as required.

It can be contemplated by those skilled in the art the user may also customize a color based on his or her need or mood.

In an embodiment of the present disclosure, the current profile is a look-up table or a current conversion function converting a color metric value to an operating current amplitude, the step of determining comprises converting the designated color metric value to the operating current amplitude based on the look-up table or the current conversion function.

The current profile may be designed as a look-up table and made available to the controller by having it stored in an internal memory of the controller for example. The look-up table may be easily used to facilitate the conversion of a color temperature to an operating current amplitude of the LED lighting device. The determining step is therefore straightforward and easy to implement, costing essentially negligible extra resources for the controller.

Alternatively, the current profile may be designed as a current conversion function, which takes a designated current as an input and generates an appropriate operating current amplitude as an output. The determining step therefore can obtain the operating current amplitude from the conversion function.

In an embodiment of the present disclosure, the operating current amplitude for the LED lighting device is determined further based on at least one of a reference current and a reference flux output of the LED lighting device.

It can be contemplated by those skilled in the art that the operating current amplitude has to be within a reference current such as a nominal current of the LED lighting device itself. A reference flux output may also be considered in determining the operating current amplitude of the LED lighting device, allowing the lighting device to achieve improved efficacy and flux output at the same time.

In an embodiment of the present disclosure, the method further comprises a step of determining a duty cycle for each switch controlling a corresponding LED light source.

By this means, a duty cycle required for each LED light source can still be independently determined. The dimming and color appearance of each LED light source is thereby still individually controlled, allowing the LED light source to maintain a high power efficacy.

Specifically, in an embodiment of the present disclosure, the duty cycle is determined according to at least one of the determined operating current amplitude and a reference flux output of the LED lighting device.

This also allows the color appearance of the LED lighting device to be tuned in a more refined way.

In a second aspect of the present disclosure, there is presented a light emitting diode, LED, lighting device, comprising at least two series-connected LED light sources with different color metric values and supplied with a current, each LED light source being controlled by a respective switch operating according to a duty cycle, the LED lighting device further comprising a processor for controlling the LED lighting device, the processor comprising:

- a receive module arranged for receiving a designated color metric value for the LED lighting device;
- a determine module arranged for determining an operating current amplitude for the LED lighting device based on a current profile over a range of color metric values and the designated color metric value, and
- a set module arranged for setting the current supplied to the LED light sources to the determined operating current amplitude.

The LED is controlled by the processor which operates according to the method of controlling the LED lighting device, by determining the operating current amplitude of the LED lighting device based on the designated color temperature, thereby providing optimized output flux as well as optimized efficacy for the LED lighting device.

The functional modules of the processor may operate to perform respective control functions as described in the method according to the first aspect of the present disclosure.

It can be contemplated by those skilled in the art, the processor may be integrated to an internal control part of the LED lighting device. On the other hand, the processor may be a separate processor arranged for example inside a remote controller or a control panel for controlling the LED lighting device.

In a third aspect of the present disclosure, a computer program product is provided, comprising a computer readable storage medium storing instructions which, when executed on at least one processor, cause the at least one processor to carry out the method according to the first aspect of the present disclosure.

The above mentioned and other features and advantages of the disclosure will be best understood from the following description referring to the attached drawings. In the drawings, like reference numerals denote identical parts or parts performing an identical or comparable function or operation.

DETAILED DESCRIPTION

Embodiments contemplated by the present disclosure will now be described in more detail with reference to the accompanying drawings. The disclosed subject matter should not be construed as limited to only the embodiments set forth herein. Rather, the illustrated embodiments are provided by way of example to convey the scope of the subject matter to those skilled in the art.

Figure 1:
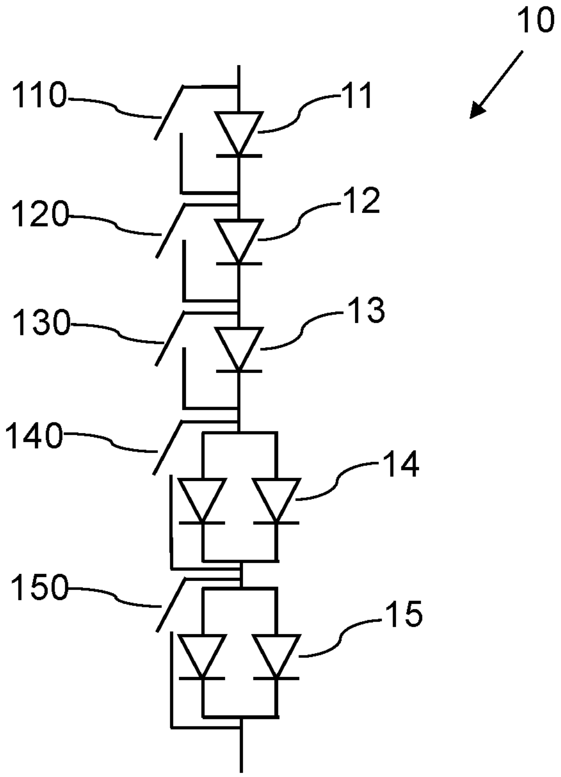
FIG. 1 schematically illustrates a diagram of series-connected light emitting diode, LED, light sources of a multicolor LED lighting device.

FIG. 1 schematically illustrates a diagram 10 of series-connected light emitting diode, LED, light sources of a multicolor LED lighting device. In the diagram 10 five LEDs respectively marked with numerals 11 to 15 are shown, the five LEDs 11 to 15 may be respectively of colors of red, green, blue, warm white and cold white, for example. The LEDs 11 to 15 are connected in a single string and driven with a fixed current (not shown). Pulse Width Modulation signals are provided to the switches 110 to 150, which are respectively used to control the LEDs 11 to 15 by close or open the switches of the LEDs, thereby controlling color and output flux of the lighting device comprising the LEDs 11 to 15. Preferably, the switches are placed in parallel with the LEDs.

Figure 2:
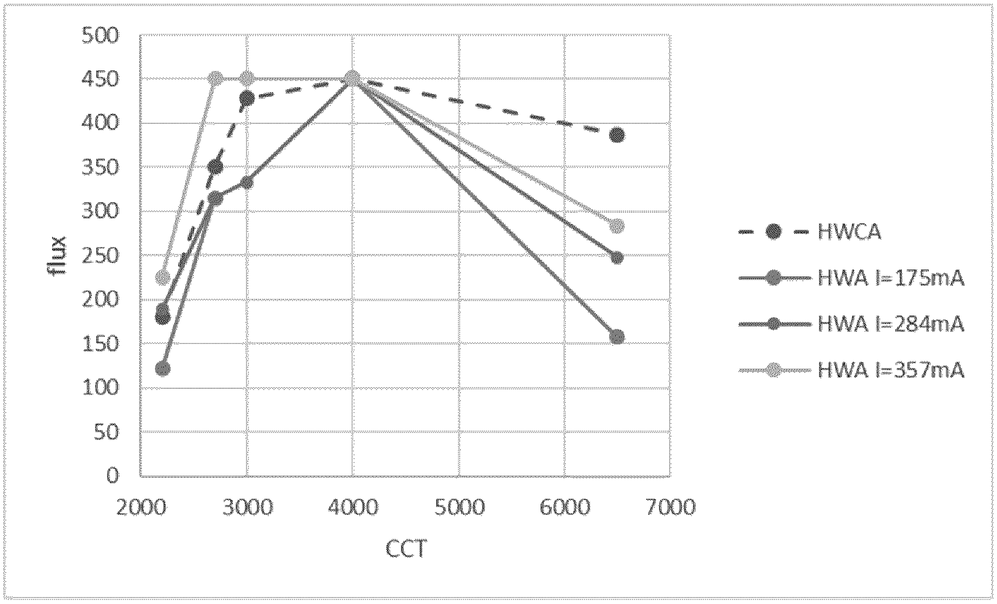
FIG. 2 is a graph schematically illustrating a relationship between the generated flux and the current of an LED lighting device.

With an LED lighting device, a maximum efficacy is usually required around a color point where an output flux of the LED light device is the highest, this is either due to regulation considerations or because of a limit to a power related to the maximum heat that the LED lighting device can withstand. FIG. 2 is a graph schematically illustrating a relationship between the generated flux output and the current of a LED lighting device. It is seen from FIG. 2 that with higher current more flux output can be generated at extreme Correlated Color Temperature, CCT, points such as 2200K and 6500K, or in the corners of the color gamut.

On the other hand, with a higher peak current, the efficacy of the LED lamp will decrease. As a result, a trade-off is often selected between the efficacy and the flux output of the LED lamp, which will reduce the flux capability and also the efficacy of the LED lamp. by some LED light sources.

The present disclosure proposes a method and a controller for controlling an LED lighting device comprising multiple LED light sources, the method can help to achieve optimized lighting performance, that is, with higher flux as well as higher efficacy of the LED lighting devices.

Figure 3:
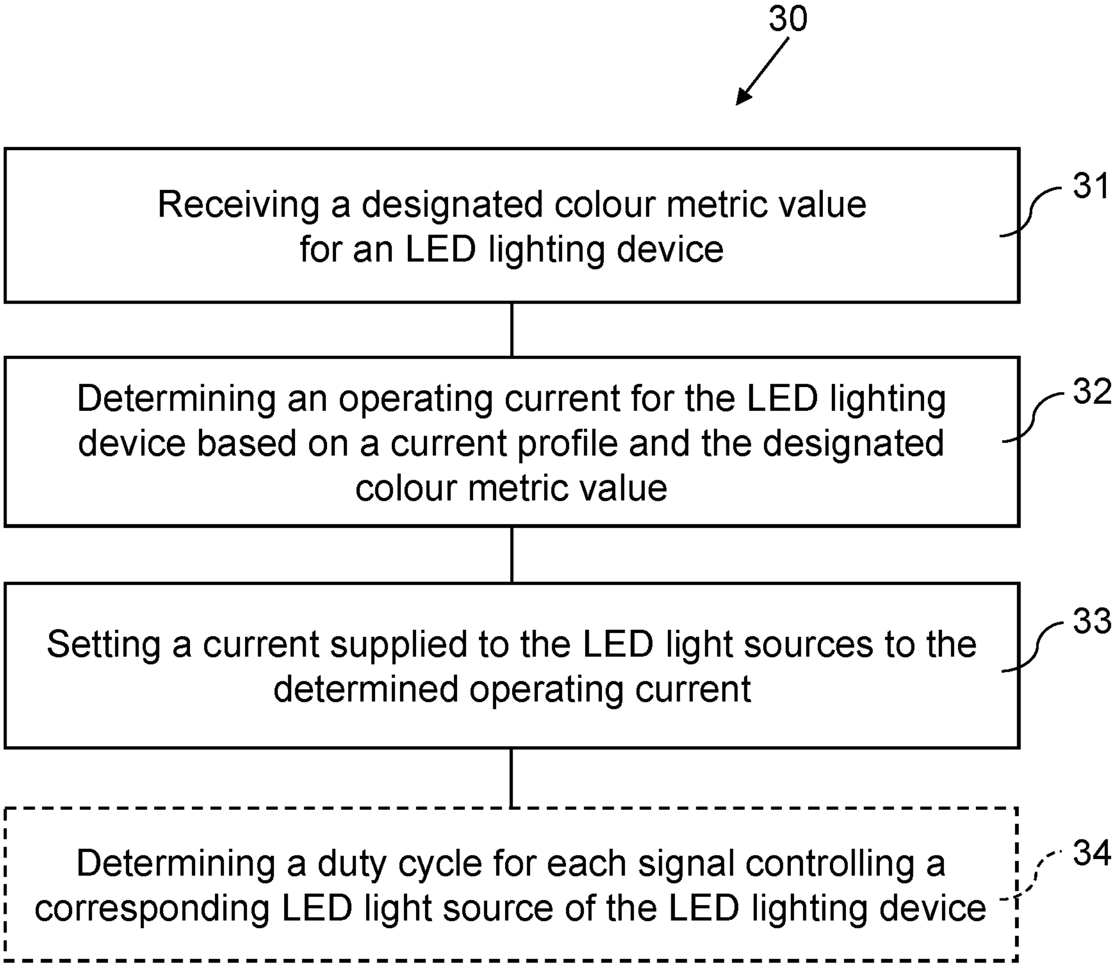
FIG. 3 illustrates, in a flow-chart type diagram, a method of controlling an LED lighting device in accordance with an embodiment of the present disclosure.

FIG. 3 illustrates, in a flow-chart type diagram, a method 30 of controlling an LED lighting device in accordance with an embodiment of the present disclosure.

The method 30 may be performed by a processor or a controller used to control an LED lighting device comprising at least two LED light sources. The at least two LED light sources are connected in series in a string and supplied with a current. Each of the at least two LED light sources is controlled by for example a Pulse Width Module, PWM, signal via a respective switch, so that the LED light source may be switched on and off, according to a required light color scheme.

The controller may be an integral module of the LED lighting device or a separate control device. As an example, the controller may be a processer of the LED lighting device.

Each LED light source may have a color appearance represented by a color metric value, such as a color temperature, represented as a correlated color temperature, CCT, or a Commission internationale de l'éclairage, CIE, xy coordinates.

At step 31, "Receiving a designated color metric value for an LED lighting device", the processor receives a color metric value for a required color. As an example, a user may push a button for selecting a specific color on a remote controller of the LED lighting device, which may generate a signal to the processor. The selected color may be translated into a color temperature or a set of CIE xy coordinates for the processor, which will be used to control the LED lighting device accordingly.

At step 32, "Determining an operating current amplitude for the LED lighting device based on a current profile and the designated color matric value", the controller may determine an operating current amplitude for the LED lighting device, that is, a current for driving each LED light source of the LED lighting device, based on a current profile, together with the designated color metric value.

Figure 4:
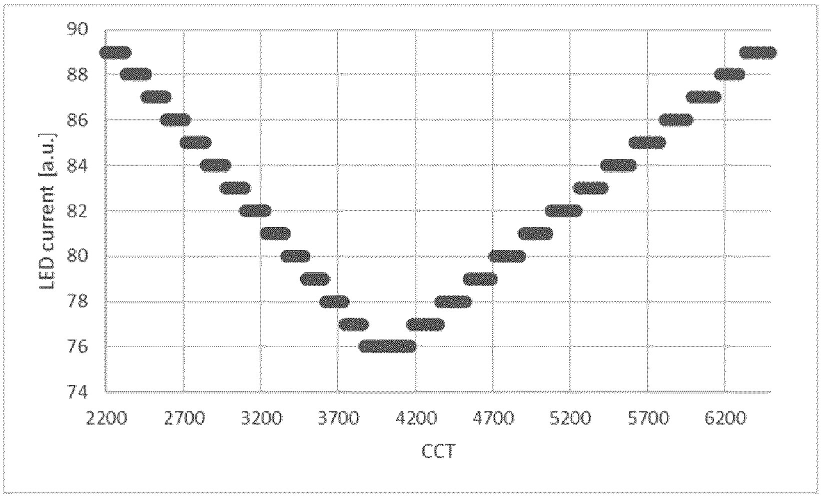
FIG. 4 schematically illustrates a current conversion profile designed as a conversion function from CCT values to LED currents.

The current profile may be designed over a range of xy coordinates or CCT values. FIG. 4 schematically illustrates a current conversion profile designed as a conversion function from CCT values to LED currents. The controller can easily determine an appropriate operating current amplitude by using the conversion function as illustrated in FIG. 4.

The currents for different CCT values as illustrated in FIG. 4 are relative currents in arbitrary units. If the current supplied to the LED light sources is changed according to conversion function as illustrated in FIG. 4, the lamp flux output can be increased for color points different than 4000 K. It can be seen that at the highest flux output the current amplitude is the lowest to meet the efficiency requirements.

Alternatively, the current profile may be designed as a look-up table, which may be used to convert a received designated color metric value to a suitable operating current amplitude for the LED lighting device.

In determining the operating current amplitude, it may also take into consideration other factors such as a reference current or a reference flux output, or a combination of the two. The reference current may be for example a nominal current for the LED lighting device. The reference flux output may be a flux conforming to regulations and specifications.

Next, at step 33, "Setting a current supplied to the LED light sources to the determined operating current amplitude", the processor sets the current supplied to the LED lighting device, that is, the current driving each of the LED light sources, to the operating current amplitude determined at step 32.

Figure 5:
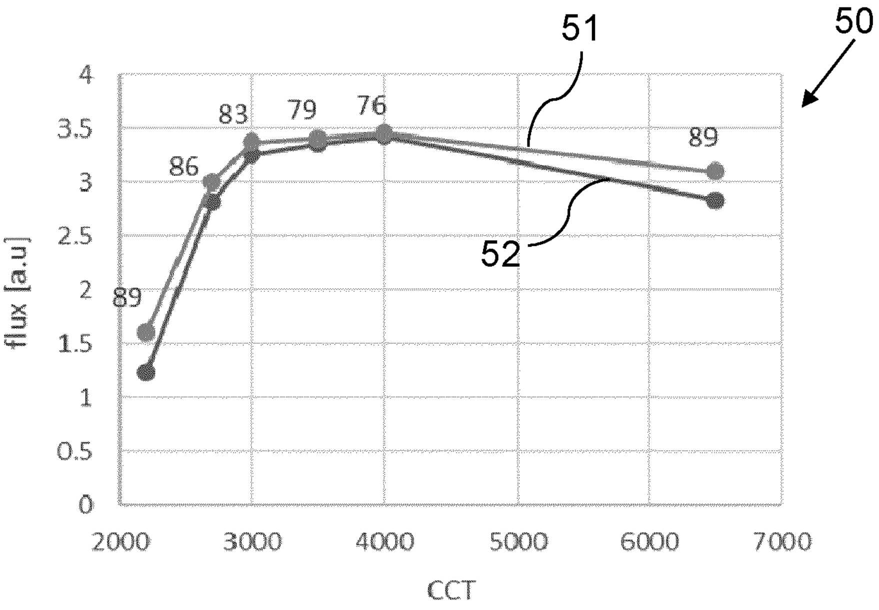
FIG. 5 is a graph schematically illustrating comparison between flux curves obtained with a fixed current and a variable current.

The determined operating current amplitude allows the LED lighting device to have optimal flux output at the designated color temperature, for example. FIG. 5 is a graph 50 schematically illustrating flux output curves obtained with a fixed current and a variable current. In FIG. 5, curve 51 is a flux output curve obtained for a LED lighting device with a current controlled according to the above described method, and curve 52 is a flux output curve obtained for the LED lighting device with a fixed current. The flux outputs are in arbitrary units.

It is seen from FIG. 5 that the flux output of the LED lighting device is increased for color points different than 4000 K, when the operating current amplitude supplied to the LED lighting device is varied according to the color metric value which is designated for example by the user. The flux output of the LED lighting device is thereby optimized.

The processor may also, at step 34, determine required PWM settings related to the operating current amplitude for the designated color metric. As an example, the controller may determine a duty cycle for each PWM signal controlling a respective LED light source. In determining the PWM settings, the method may also consider the reference flux.

This allows the efficacy of the respective LED light sources to be optimized, based on the determined operating current amplitude.

The method therefore allows the LED lighting device to be controlled in such a way that optimized power efficacy and optimized flux output are achieved at the same time.

Figure 6:
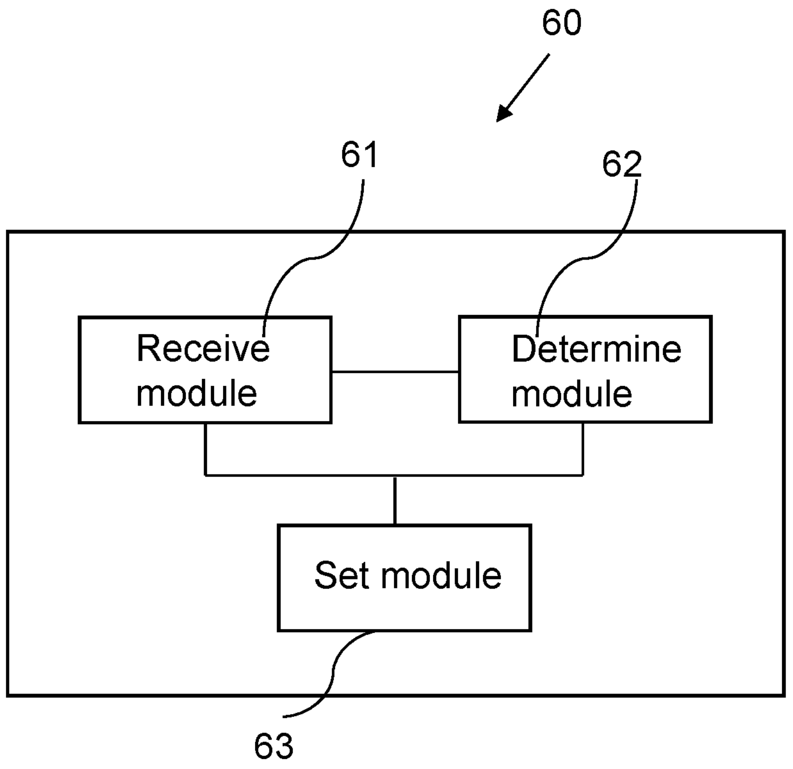
FIG. 6 schematically illustrates a controller for controlling a LED lighting device in accordance with the present disclosure.

FIG. 6 illustrates, in a schematic diagram, a controller 60 for controlling a LED lighting device in accordance with the present disclosure.

The controller 60 may comprise a receive module 61, a determine module 62, and a set module 63.

The receive module 61 is arranged for receiving a designated color metric value for the LED lighting device, for example, as described above with reference to step 31 of FIG. 3.

The determine module 62 is arranged for determining an operating current amplitude for the LED lighting device based on a current profile over a range of color metric values and the designated color metric value, for example, as described above with reference to step 32 of FIG. 3. The determine module 62 may be further arranged for determining the operating current amplitude taking other factors such as a reference current or/and a reference flux.

The set module 63 is arranged for setting the current supplied to the LED light sources to the determined operating current amplitude, for example, as described above with reference to step 34 of FIG. 3.

The determine module 62 may be further arranged for determining PWM settings related to the operating current amplitude at the designated color point.

Figure 7:
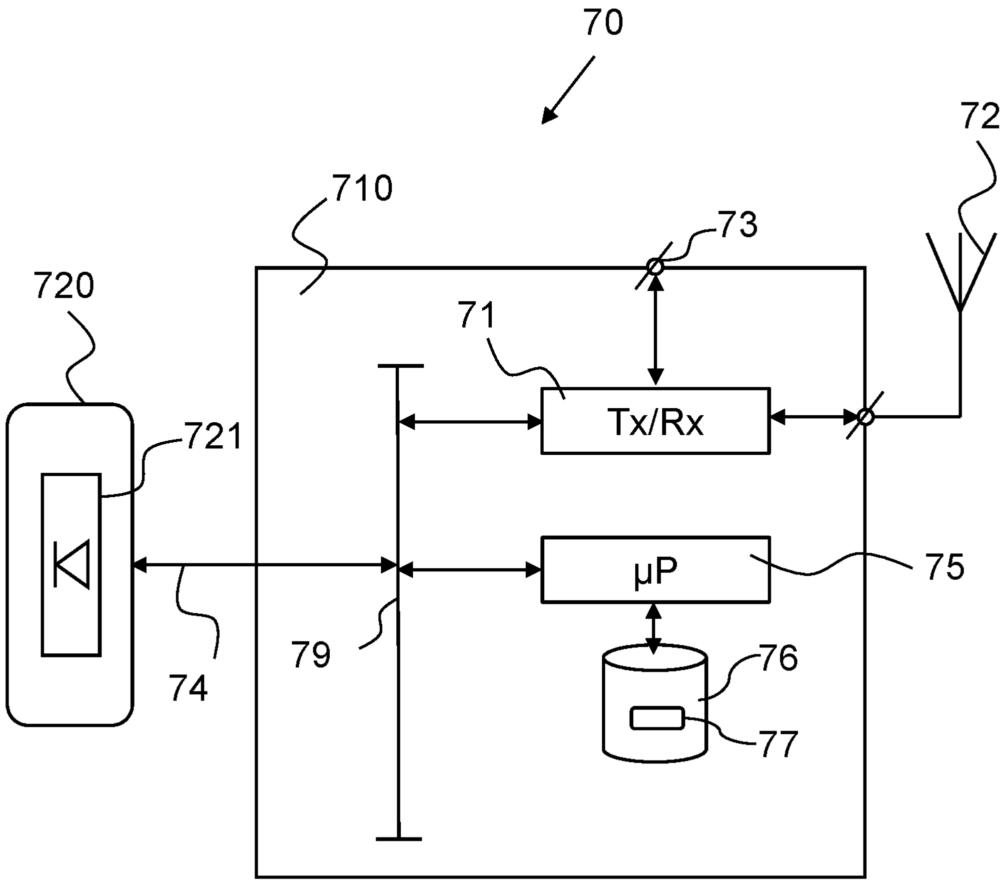
FIG. 7 schematically illustrates a LED lighting device comprising a controller in accordance with the present disclosure.

FIG. 7 schematically illustrates an LED lighting device 70 comprising the controller in accordance with the present disclosure.

The LED lighting device 70 may comprise a control part or control device 710 and a load such as a lighting fixture or lighting device 620, comprising a lighting module 721, such an LED lighting module comprising multiple LED light sources. The control device 710 may control operation of the lighting module 721, for example according to the method of the present disclosure. The control device 710 may comprise the controller as described with reference to FIG. 6.

The control device 710 operates a communication interface 71, such as a network adapter or transceiver, Tx/Rx, module arranged for wireless 72 or wired 73 exchange of messages or data packets with for example another LED lighting device in a network. The communication interface 71 may function as the receive module of the controller 60 for controlling the LED lighting device.

Network protocols for exchanging data by networked devices or nodes may comprise ZigBee™, Bluetooth™, as well as WiFi based protocols for wireless networks, and wired bus networks such as DALI™ (Digital Addressable Lighting Interface), DSI (Digital Serial Interface), DMX (Digital Multiplex), and KNX (or KNX based systems), and other proprietary protocols.

The control device 710 further comprises at least one microprocessor, or controller 75, and at least one data repository or storage or memory 76, among others for storing for example the current profile described above.

The at least one microprocessor or controller 75 communicatively interacts with and controls the communication interface 71, and the at least one data repository or storage 76 via an internal data communication and control bus 79 of the control device 710. The at least one microprocessor or controller 75 may operate one or a plurality of algorithms or applications, and perform the method of controlling the LED lighting device 720.

The at least one microprocessor or controller 75 may function as the determine module and set module of the controller 60 for controlling the LED lighting device.

The lighting fixture or lighting device 720 connects to and is controlled from the data communication and control bus 79 by the at least one microprocessor or controller 710 via a connection link 74.

The present disclosure is not limited to the examples as disclosed above, and can be modified and enhanced by those skilled in the art beyond the scope of the present disclosure as disclosed in the appended claims without having to apply inventive skills and for use in any data communication, data exchange and data processing environment, system or network.

The invention claimed is:

1. A method of controlling a light emitting diode (LED) lighting device, the LED lighting device comprising at least two series-connected LED light sources with different color metric values and supplied with a current, each LED light source being controlled by a respective switch coupled in parallel to the respective LED light source and operating according to a duty cycle, the method comprising:

receiving a designated color metric value for the LED lighting device;

determining an operating current amplitude for the LED lighting device based on a current profile over a range of color metric values and the designated color metric value, and setting the current supplied to the LED light sources to the operating current amplitude, wherein the current profile is such that the operating current amplitude is lower at a first color metric value than at a second color metric value, wherein the first color metric value is associated with a first flux, wherein the second color metric value is associated with a second flux, wherein the first flux is higher than the second flux, and wherein the designated color metric value comprises a color temperature value or a set of color coordinates.

2. The method according to claim 1, wherein the designated color metric value is received from a user.

3. The method according to claim 1, wherein the current profile is a look-up table or a current conversion function converting color metric values to operating current amplitudes, wherein determining further comprises converting the designated color metric value to the operating current amplitude based on the look-up table or the current conversion function.

4. The method according to claim 1, further comprising a step of determining a duty cycle for each switch controlling a corresponding LED light source.

5. The method according to claim 4, the duty cycle is determined according to at least one of the operating current amplitude and a reference flux.

6. A light emitting diode (LED) lighting device, comprising:

at least two series-connected LED light sources with different color metric values and supplied with a current;

at least two switches, each LED light source being controlled by a parallel to the LED light source connected respective switch operating according to a duty cycle; and a processor for controlling the LED lighting device, the processor comprising:

a receive module arranged for receiving a designated color metric value for the LED lighting device;

a determine module arranged for determining an operating current amplitude for the LED lighting device based on a current profile over a range of color metric values and the designated color metric value, and a set module arranged for setting the current supplied to the LED light sources to the operating current amplitude, wherein the current profile is such that the operating current amplitude is lower at a first color metric value than at a second color metric value, wherein the first color metric value is associated with a first flux, wherein the second color metric value is associated with a second flux, wherein the first flux is higher than the second flux, wherein the designated color metric value comprises a color temperature value or a set of color coordinates, and wherein the current profile is a look-up table or a current conversion function converting color metric values to operating current amplitudes, the determine module is arranged for converting the designated color metric value to the operating current amplitude based on the look-up table or the current conversion function.

7. The LED lighting device according to claim 6, wherein the receive module is arranged for receiving the designated color metric value from a user.

8. The LED lighting device according to claim 6, wherein the determine module is further arranged for determining a duty cycle for each switch controlling a corresponding LED light source.

9. The LED lighting device according to claim 8, wherein the determine module is arranged for determining the duty cycle according to at least one of the operating current amplitude and a reference flux.

10. A non-transitory computer readable storage medium storing instructions which, when executed on at least one processor, cause said at least one processor to carry out the method according to claim 1.

* * * * *